United States Patent
Sceery et al.

(10) Patent No.: US 7,970,120 B2
(45) Date of Patent: Jun. 28, 2011

(54) CELL PHONE BASED ANIMAL SOUND IMITATION

(76) Inventors: Edward J. Sceery, Santa Fe, NM (US); Richard Krukar, Albuquerque, NM (US)

( * ) Notice: Subject to any disclaimer, the term of this patent is extended or adjusted under 35 U.S.C. 154(b) by 1187 days.

(21) Appl. No.: 11/622,370

(22) Filed: Jan. 11, 2007

(65) Prior Publication Data
US 2008/0171574 A1 Jul. 17, 2008

(51) Int. Cl.
*H04M 1/65* (2006.01)
*H04B 1/38* (2006.01)

(52) U.S. Cl. ............... 379/387.01; 455/3.06; 455/414.4; 455/556.1; 705/51; 705/54

(58) Field of Classification Search ............... 379/93.04, 379/142.01, 142.04, 207.08, 207.16, 373.09, 379/387.01; 381/61; 455/550.1, 556.1, 557, 455/558, 567, 3.06, 414.4; 705/35, 51, 54; 709/217
See application file for complete search history.

(56) References Cited

U.S. PATENT DOCUMENTS

| | | | |
|---|---|---|---|
| 5,636,276 A * | 6/1997 | Brugger | 705/54 |
| 6,018,654 A * | 1/2000 | Valentine et al. | 455/414.4 |
| 6,385,596 B1 * | 5/2002 | Wiser et al. | 705/51 |
| 6,681,120 B1 * | 1/2004 | Kim | 455/556.1 |
| 6,782,080 B2 * | 8/2004 | Leivo et al. | 379/93.04 |
| 6,823,199 B2 * | 11/2004 | Gough | 455/567 |
| 7,113,981 B2 * | 9/2006 | Slate | 709/217 |
| 7,254,414 B2 * | 8/2007 | Nakamura et al. | 455/556.1 |
| 7,336,777 B2 * | 2/2008 | Lee et al. | 379/207.08 |
| 7,601,905 B2 * | 10/2009 | Yanase et al. | 84/600 |
| 7,729,487 B2 * | 6/2010 | Koch | 379/207.16 |
| 2002/0009184 A1 * | 1/2002 | Shnier | 379/142.01 |
| 2002/0018556 A1 * | 2/2002 | Okazaki et al. | 379/373.02 |
| 2004/0184590 A1 * | 9/2004 | Jia | 379/142.04 |
| 2005/0124375 A1 * | 6/2005 | Nowosielski | 455/550.1 |
| 2006/0116167 A1 * | 6/2006 | Raviv et al. | 455/558 |
| 2006/0205439 A1 * | 9/2006 | Havukainen | 455/567 |
| 2006/0258405 A1 * | 11/2006 | Gonzalez | 455/567 |

* cited by examiner

*Primary Examiner* — Gerald Gauthier
(74) *Attorney, Agent, or Firm* — Ortiz & Lopez, PLLC; Richard Krukar

(57) ABSTRACT

A cell phone based sound producing device is a sound producing device that takes advantage of the likelihood that a user is already carrying a cell phone and does not need to also carry an electronic sound producing device. Another advantage is that cell phones are designed to communicate across a communications network. As such, the cell phone based sound producing device can download call sounds from a server, store them, and play them. Electronic payment systems for ring tones and games that are played on a cell phone already exist. These electronic payment systems can be easily adapted for payment of sound producing device modules and sound producing device sounds. Recovery information can be used to restore modules and sounds that are lost due to cell phone breakage or upgrades.

3 Claims, 7 Drawing Sheets

CELL PHONE BASED ANIMAL SOUND IMITATION

TECHNICAL FIELD

Embodiments relate to game calls, sound producing devices, digital audio devices, remote controls, cellular telephones, communications networks, and data servers. Embodiments also relate to hunting, wildlife observation, and wildlife vocalizations.

BACKGROUND OF THE INVENTION

People have made and used sound producing devices to produce sounds since prehistoric times and continue to make and use them. Sounds are produced for a variety of reasons. Call sounds are sounds whose purpose is to imitate an animal. Call sounds can entice an animal to respond and sometimes to come closer. Over time, sound production technology has changed while the purposes have largely remained the same.

A caller uses a sound producing device to produce a call sound. In general, the call sound is an attractive sound such as an imitation of an animal vocalization. Different call sounds are appropriate for enticing different animals. For example, elk can respond to any of a variety of elk vocalizations or other attractive sounds such as antlers thrashing in brush. Similarly, turkey can respond to any of a variety of turkey vocalizations or other attractive sounds such as beating wings. Predators, such as coyotes, often respond to prey animal vocalizations such as those of a distressed rabbit.

Electronic game calls are sound producing devices that are readily available from a variety of manufacturers. The electronic game calls store digitized game animal vocalizations and other attractive call sounds. Electronic game calls, however, are additional pieces of equipment that must be carried or bought. Furthermore, the most advanced electronic game calls have cumbersome methods at best for obtaining and storing new call sounds. A need therefore exists for an easily loaded and carried electronic sound producing device for imitating animal sounds.

BRIEF SUMMARY

The following summary is provided to facilitate an understanding of some of the innovative features unique to the embodiments and is not intended to be a full description. A full appreciation of the various aspects of the embodiments can be gained by taking the entire specification, claims, drawings, and abstract as a whole.

It is therefore an aspect of the embodiments to provide an electronic device comprising a keypad, and a display. A non-volatile memory stores at least one stored call sound such that the electronic device can access the stored call sound.

It is also an aspect of the embodiments to present a user interface to a user. The display and the keypad are used for the user interface. A presentation of call sound options is presented on the display. Each call sound option corresponds to an available call sound. The user can use the keypad to select one of the call sound options to produce a call sound selection corresponding to a selected call sound. The stored call sounds can be available as can be some served gamed calls provided by a server.

It is another aspect of the embodiments that a call sound retrieval module can obtain served call sounds from the server and can store them in the non-volatile memory. Storing a served call sound in the non-volatile memory produces a stored call sound.

It is also another aspect of the embodiments that a animal and bird simulating module accesses the stored call sounds and plays them on a speaker. The speaker can be an internal speaker that is part of the electronic device or can be an external speaker that is not. External speakers receive signals from the electronic device and use them to produce sound. Signals can be transmitted using wires, wirelessly using electromagnetic radiation, or in some other way.

It is a further aspect of the embodiments that the electronic device can be a cell phone. A cell phone can be adapted for use as an electronic sound producing device by adding the appropriate modules, such as the call sound retrieval module and the animal and bird simulating module. Some embodiments can also include a cell phone control module that can turn off the cell phone's cellular radio and thereby conserve energy.

BRIEF DESCRIPTION OF THE DRAWINGS

The accompanying figures, in which like reference numerals refer to identical or functionally similar elements throughout the separate views and which are incorporated in and form a part of the specification, further illustrate aspects of the embodiments and, together with the background, brief summary, and detailed description serve to explain the principles of the embodiments.

DETAILED DESCRIPTION

The particular values and configurations discussed in these non-limiting examples can be varied and are cited merely to illustrate at least one embodiment and are not intended to limit the scope thereof. In general, the figures are not to scale.

Figure 1:
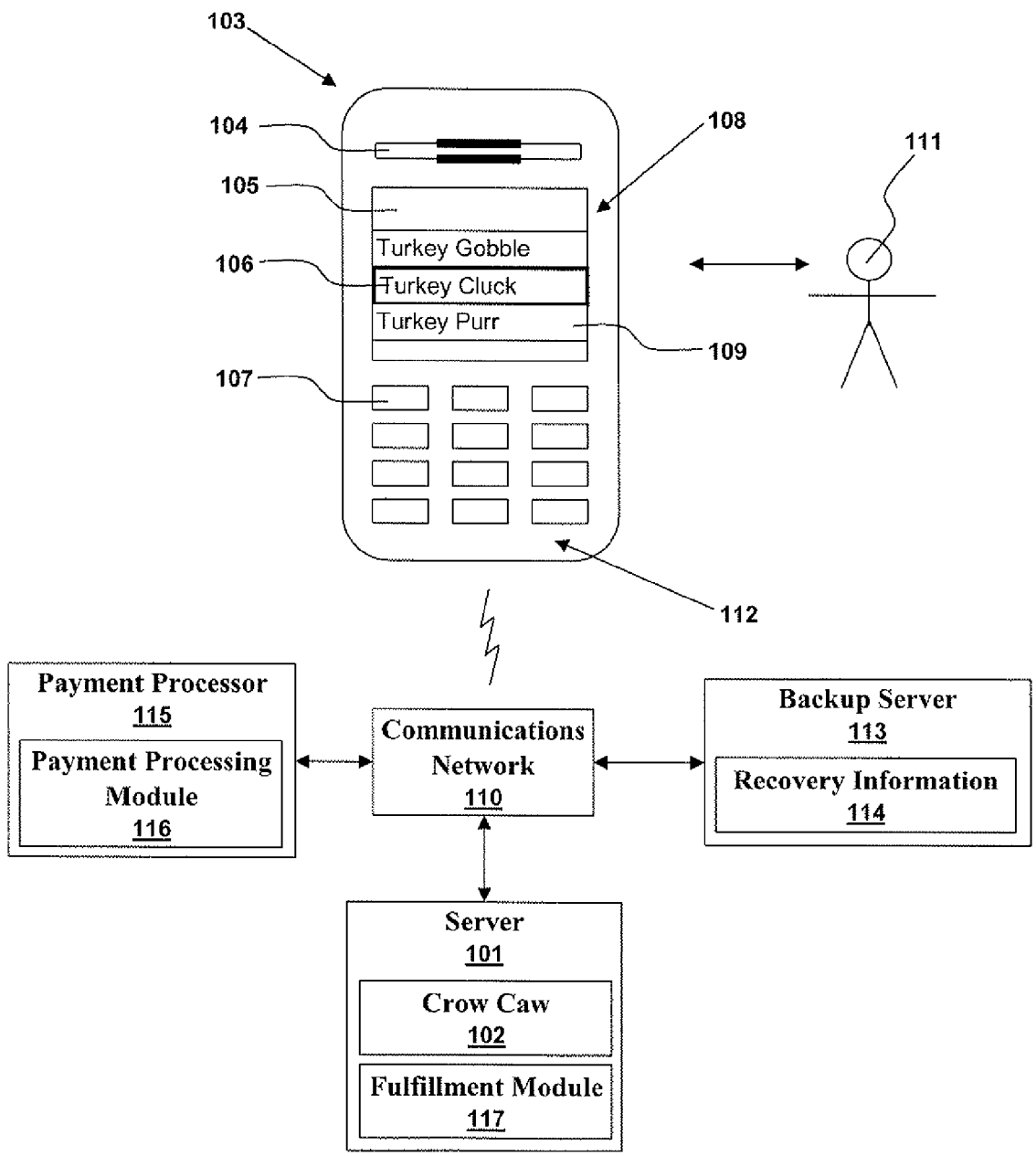
FIG. 1 illustrates a cell phone adapted for use as a sound producing device in accordance with aspects of the embodiments.

FIG. 1 illustrates a cell phone 103 adapted for use as a sound producing device in accordance with aspects of the embodiments. The cell phone 103 has an internal speaker 104, display 105, and keypad 112. The display 105 is illustrated as showing a presentation 108 of available call sounds such as "Turkey Cluck" 106 and "Turkey Purr" 109. "Turkey Cluck" 106 is also the selected call sound as indicated by the heavy outline. The keypad 112 is a human input device (HID) having keys 107 that a user 111 can press. Many cell phones have other HIDs such as joy sticks or touch sensitive displays. Regardless of the HID, the user 111 can manipulate the HID to navigate the user interface and to select available call sounds.

The cell phone 103 can use a communications network 110 to send and receive data from a sever 101. The cell phone 103 can download a served call sound, such as "Crow Caw" 102 from the server and store it in non-volatile memory. Non-volatile memory is memory that persists after a device is turned off. Storing "Crow Caw" in non-volatile memory creates the "Crow Caw" stored call sound.

Non-volatile memory can fail for a number of reasons. For example, the cell phone can catch fire destroying all stored data. A backup server 113 can be used to recover the stored data. The backup server 113 can contain recovery information 114 or the recovery information 114 can be held elsewhere, perhaps in removable storage. The recovery information 114 can be used to recover all the call sounds that the user 111 had stored in the cell phone 103.

Call sounds can be free or can be paid for. When they are paid for, the user 111 can provide information to a payment processor 115 who uses a payment processing module 116 to obtain payment. The information often includes an account number, user identifier, and the call sound, or call sounds, which the user 111 wants. The payment processor 115 can then inform a fulfillment module 117 that the user 111 is allowed to access the call sounds. The user 111 can then obtain the call sounds from the server 101.

Permission information can be used to prevent or allow the playing of call sounds. The permission information can be used to restrict the playable call sounds to those obtained from a specific server or provider. For example, a provider can encrypt a call sound so that a decryption key is required for playing it. The permission information can restrict playing to a specific device. For example, every cell phone has a unique identifier that can be used to verify that a particular cell phone is allowed to play a particular call sound. Another possibility is that a password can be required to unlock a call sound. Those familiar with the digital rights management are familiar with permission information.

Figure 2:
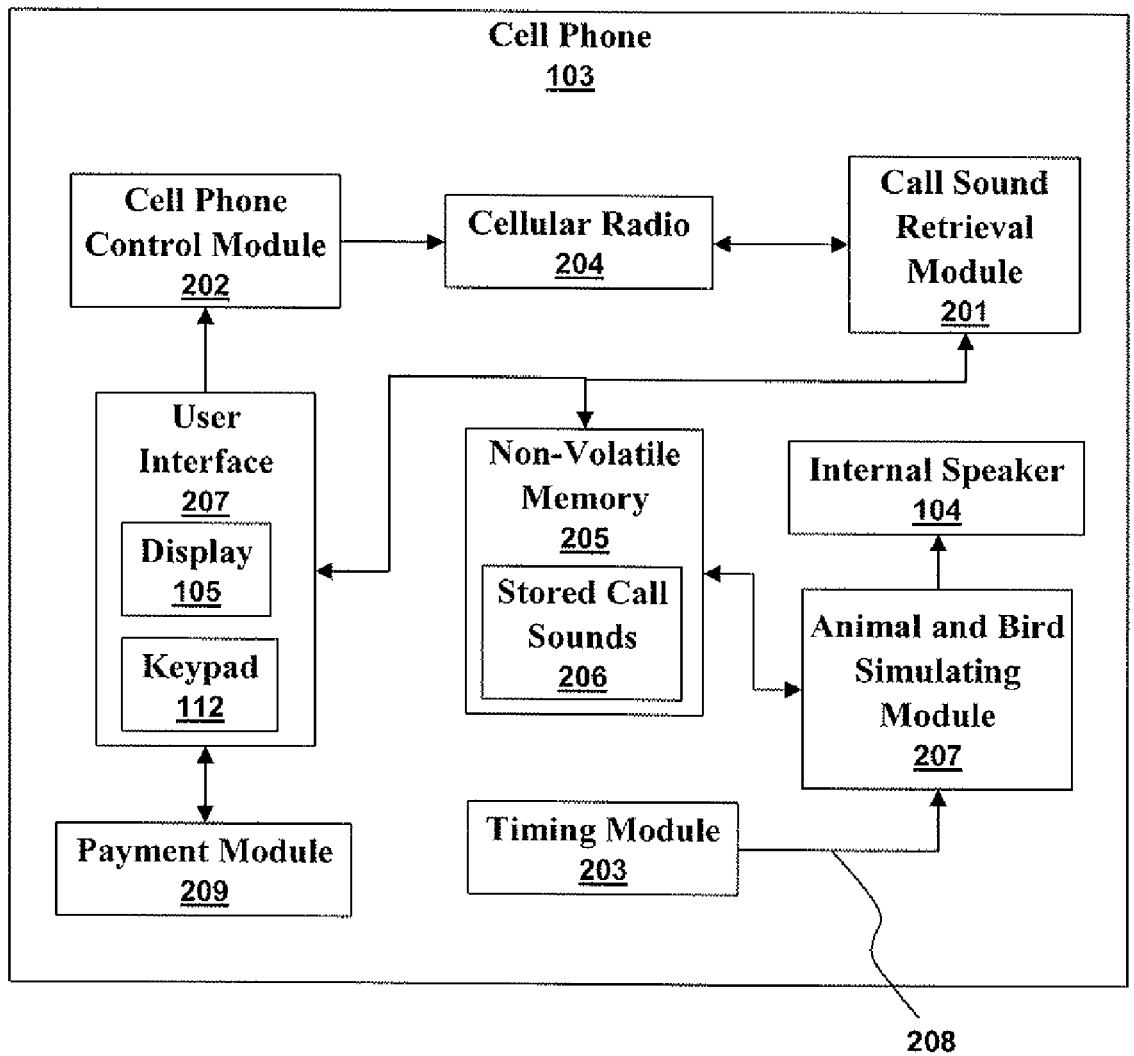
FIG. 2 illustrates a high level block diagram of a cell phone adapted for use as a sound producing device in accordance with aspects of the embodiments.

FIG. 2 illustrates a high level block diagram of a cell phone 103 adapted for use as a sound producing device in accordance with aspects of the embodiments. The cell phone 103 has a non-volatile memory 205 for storing stored call sounds 206. The keypad 112, display 105, and any other HIDs are part of the user interface 207. The cell phone uses a cellular radio 204 to communicate with the communications network. The user interface 207 is used to select available call sounds and the call sound retrieval module 201 can use the cellular radio 204 to help obtain served call sounds from a server. A animal and bird simulating module 207 can access the stored call sounds 206 and play them on a speaker 207.

The animal and bird simulating module 207 can play a call sound when a key is pressed, upon receiving a timed actuation signal 208, or upon some other event. A timing module 203 can produce the timed actuation signal 208. A timed actuation signal can be periodic or can occur once after a time period elapses.

The cell phone 103 can also contain a payment module 209 and a cell phone control module 202. The payment module 209 interacts with the payment processing module of FIG. 1 to facilitate payment. The cell phone control module 202 can shut down and restart the cellular radio 204. Shutting down the cellular radio 204 conserves energy while using the cell phone 103 as a sound producing device. The reason is that users moving outside the range of the communications network makes the cellular radio 204 useless. Furthermore, many cell phones go into a power consumptive mode when searching for a communications network or when barely in range of a communications network.

Figure 3:
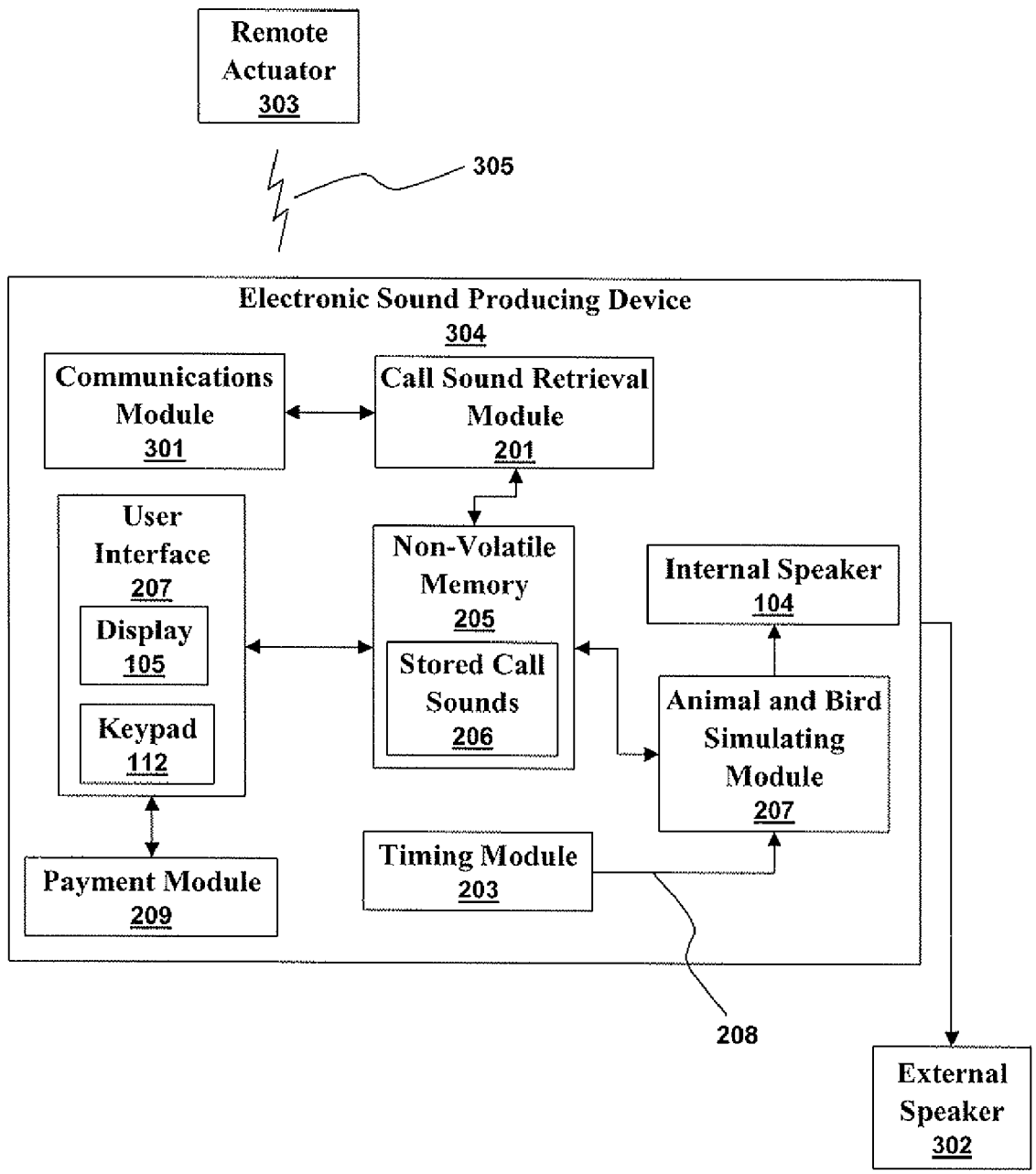
FIG. 3 illustrates a high level block diagram of an electronic sound producing device in accordance with aspects of the embodiments.

FIG. 3 illustrates a high level block diagram of an electronic sound producing device 304 in accordance with aspects of the embodiments. The electronic sound producing device 304 has many of the same components as the cell phone of FIGS. 1 and 2. However, a communications module 301 takes the place of the cellular radio. A remote actuator 303 is illustrated sending a remote actuation signal 305 that can trigger the animal and bird simulating module 207 to play the selected call sound. The animal and bird simulating module 207 can play the call sound on an external speaker 302. The external speaker can have a wired or wireless connection to the electronic sound producing device 304.

Figure 4:
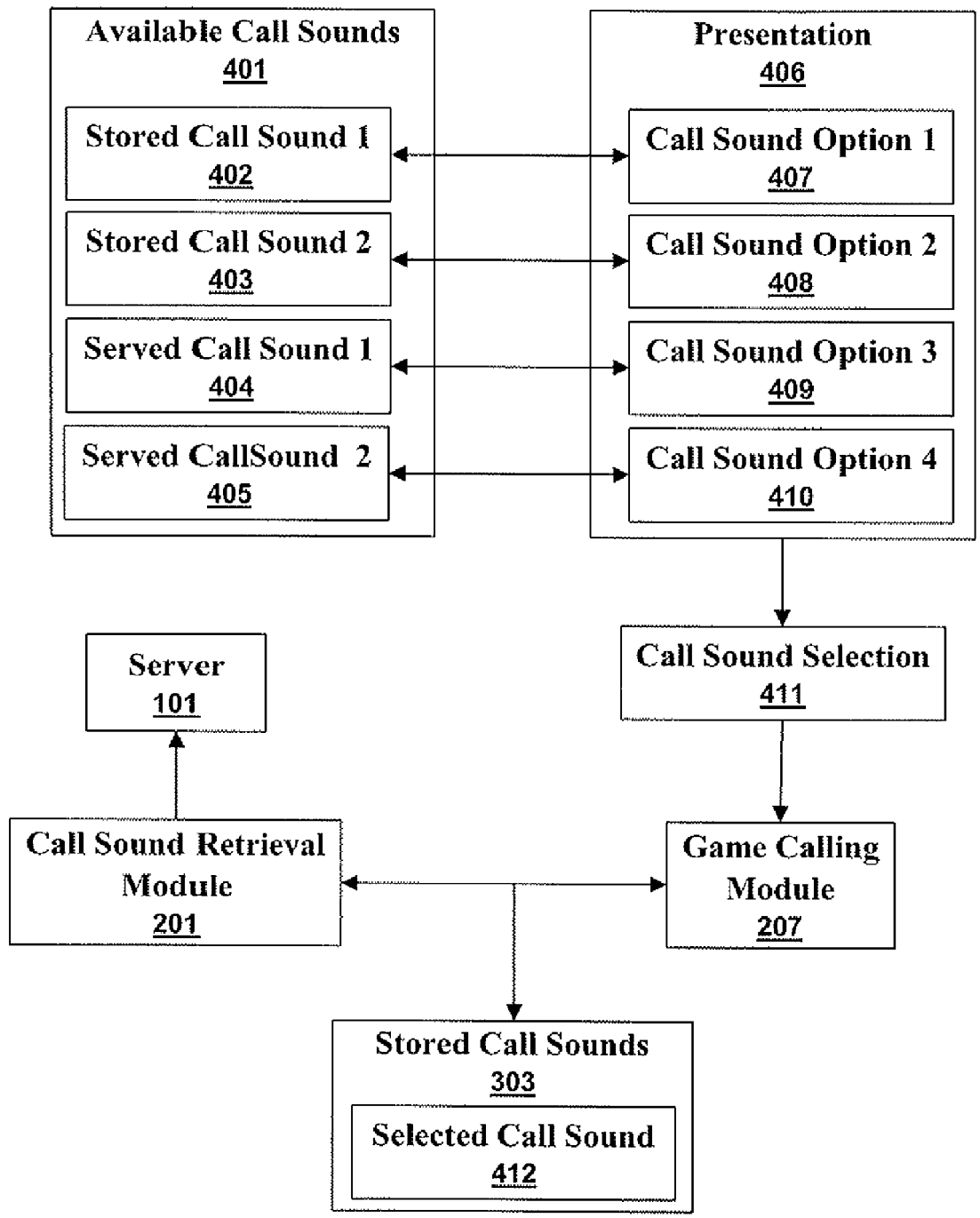
FIG. 4 illustrates available call sounds in accordance with aspects of the embodiments.

FIG. 4 illustrates available call sounds 401 in accordance with aspects of the embodiments. Stored call sound 1 402 and stored call sound 2 403 are in the non-volatile memory while served call sound 1 404 and served call sound 2 405 are on a server. All four call sounds are available because the sound retrieval module can obtain the served calls and store them. A presentation 406 presents a user with call sound options. Call sound option 1 407 corresponds to stored call 1 402. Call sound option 2 408 corresponds to stored call 2 403. Call sound option 3 409 corresponds to served call 1 404. Call sound option 4 410 corresponds to served call 2 405.

The user selects one of the call sound options as the call sound selection 411. The call sound selection 411 corresponds to the selected call sound 412 that is also one of the available call sounds 401. The call sound selection is communicated to the animal and bird simulating module 207. If the selected call sound 412 is not among the stored call sounds 303, then the call sound retrieval module 201 can obtain it from the server 101 and store it. The animal and bird simulating module 207 plays the selected call sound 412.

Figure 5:
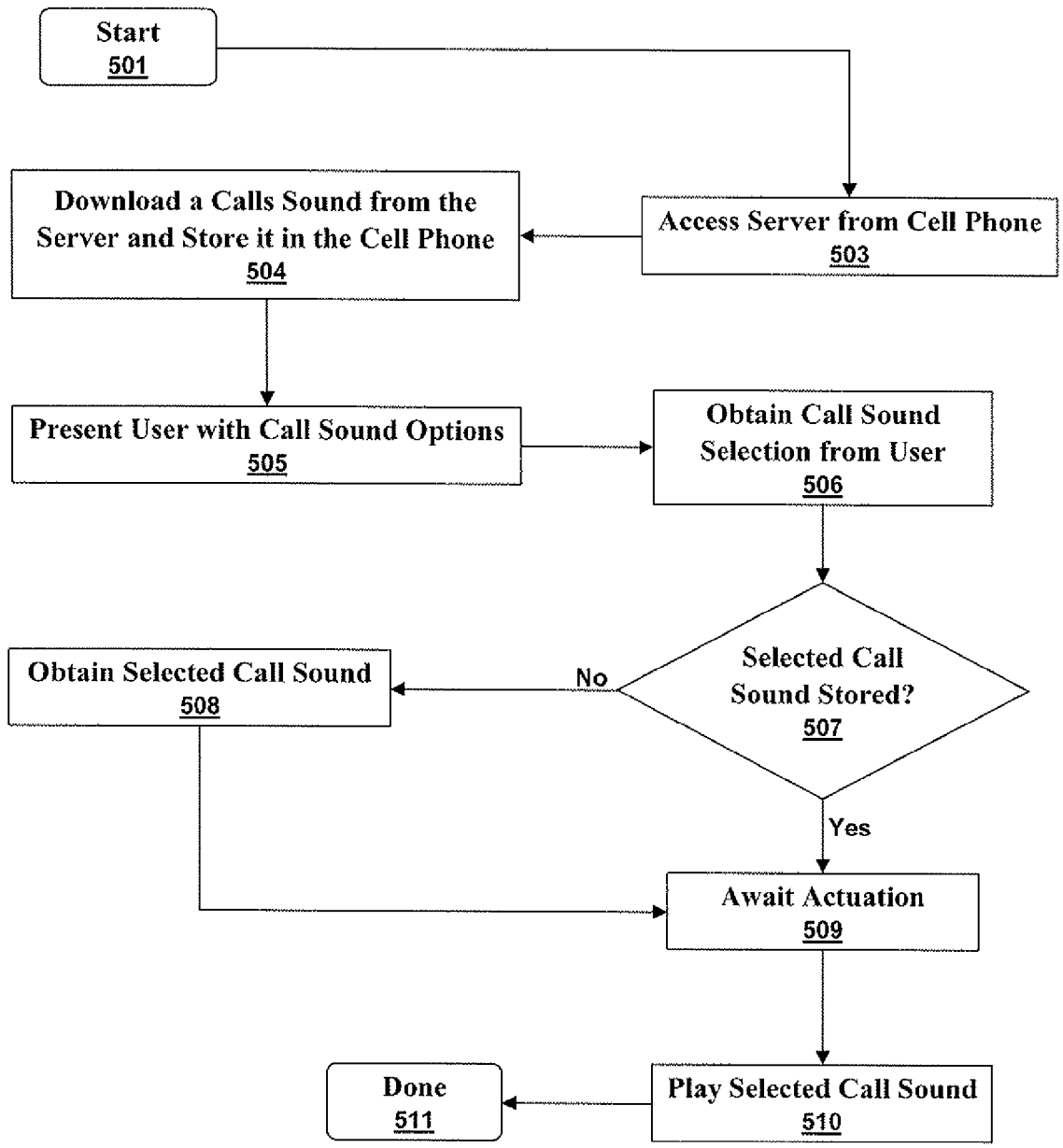
FIG. 5 illustrates a high level block diagram of obtaining and playing a call sound in accordance with aspects of the embodiments.

FIG. 5 illustrates a high level block diagram of obtaining and playing a call sound in accordance with aspects of the embodiments. After the start 501, a cell phone accesses a server 503 and downloads call sounds for storage on the cell phone 504. The user is presented with the call sound options 505 and makes a call sound selection 506. If the selected call sound is stored 507 on the cell phone, then it must be obtained 508 from the server. Once the selected call is stored, an actuation signal is waited for 509. On receiving the actuation signal, the selected call sound is played 510 and the process is done 511.

Figure 6:
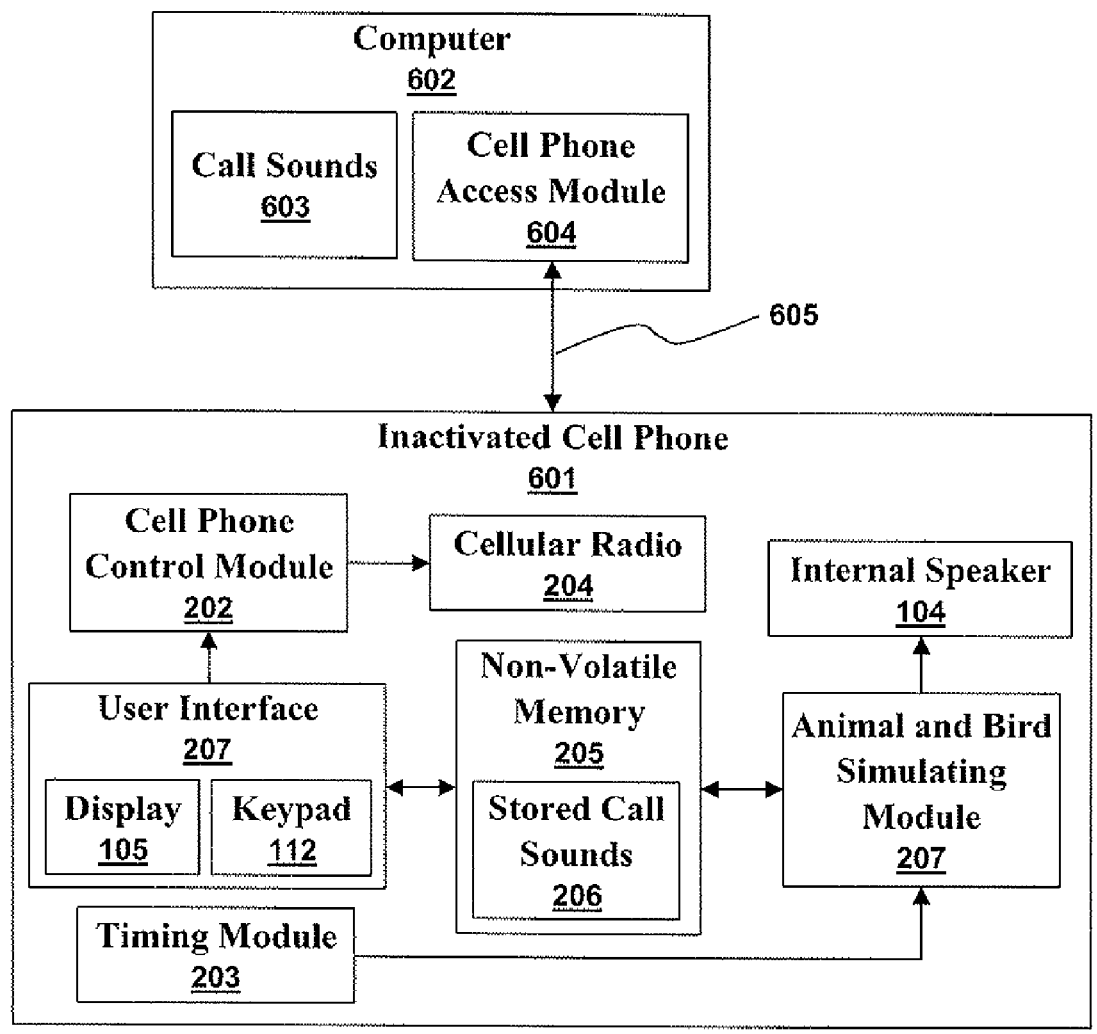
FIG. 6 illustrates a high level block diagram of using an inactivated cell phone as an electronic sound producing device in accordance with aspects of the embodiments.

FIG. 6 illustrates a high level block diagram of using an inactivated cell phone 601 as an electronic sound producing device in accordance with aspects of the embodiments. A cell phone, such as that illustrated in FIG. 2, can be inactivated by removing its association with a cellular network. For example, people often upgrade their cell phones and end up with an old cell phone that is inactivated. They cannot use the old cell phone to make calls or to access the cellular network because it is inactivated. An Inactivated cell phone 601 can have a functioning cellular radio, but the cellular network ignores it. As scuh, the cellular radio merely wastes power.

The inactivated cell phone 601 can function as an electronic sound producing device similar to the cell phone 103 of FIG. 2 with a few exceptions. The inactivated cell phone cannot use the cellular radio to connect to a server and obtain additional call sounds. Call sounds can, however, be obtained from a computer 602 with access to call sounds 603. Most cell phones, inactivated or not, can be connected to a computer by a link 605. Some links are wired and others, such as Bluetooth links, are wireless. Most computers require a cell phone access module 604 in order to access the data and modules within a cell phone. Regardless, the computer 602 can place stored call sounds 206 into a cell phone. In fact, a computer 602 can configure an inactivated cell phone 601 as an electronic sound producing device by downloading all the required call sounds and modules. As such, a useless inactivated cell phone can be recycled to produce an electronic sound producing device.

Figure 7:
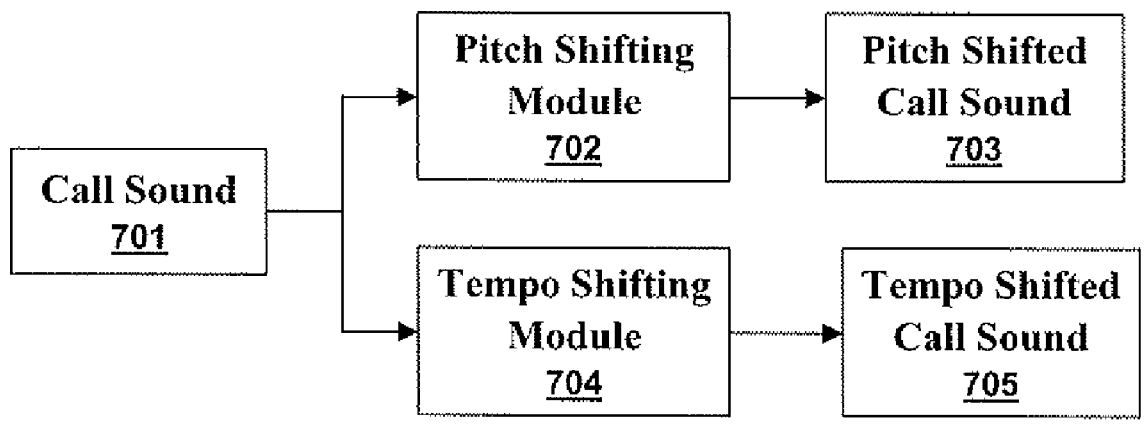
FIG. 7 illustrates shifting a call sound in pitch and tempo in accordance with aspects of the embodiments.

FIG. 7 illustrates shifting a call sound 701 in pitch and tempo in accordance with aspects of the embodiments. A call sound 701 passing through a pitch shifting module 702 results in a pitch shifted call sound 703. Passing a call sound 701 through a tempo shifting module 704 results in a tempo shifted call sound 705. Those practiced in the art of signal processing are familiar with techniques for shifting a signal's pitch or tempo.

Pitch can be shifted by modulation or by using a Fourier transform algorithm to obtain the signals spectrum. The spectrum can then simply be moved in the frequency domain and then converted back into a temporal signal. Tempo can be altered by adding or deleting sample points in the signal's digital waveform. Resampling can also be used for changing tempo. Sound engineers in the music industry often use signal processing packages to manipulate music. Pitch shifting modules, tempo shifting, and resampling modules are among the most basic modules within a modern signal processing package.

As anyone who has played a phonographic record a analog magnetic tape at the wrong speed knows, shifting tempo can cause an induced pitch change. As such, pitch shifting modules are often used to correct for the induced pitch change.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system comprising:
a cell phone comprising a keypad, a display, a cellular radio, and an internal speaker;
a non-volatile memory storing at least one stored call sound;
a user interface comprising the display and the keypad wherein a presentation is displayed on the display, wherein the presentation offers at least one available call sound comprising the at least one stored call sound, and wherein a user uses the user interface to select a selected call sound;
a call sound retrieval module that obtains at least one served call sound wherein a server serves the at least one served call sound and wherein the call sound retrieval module produces at least one of the at least one stored call sounds;
an animal and bird simulating module that accesses the at least one stored call sound and plays the at least one stored call sound on at least one speaker wherein the internal speaker is one of the at least one speaker wherein the cell phone further comprises the call retrieval module and the animal and bird simulating module;
a timing module that produces a timed actuation signal wherein the cell phone responds to the timed actuation signal by playing the selected call sound;
a remote actuator wherein the remote actuator produces a remote actuation signal wherein the cell phone reacts to the actuation signal by playing the selected call sound;
an external speaker that is one of the at least one speaker and wherein the animal and bird simulating module plays the at least one stored call sound on the external speaker;
a cell phone control module that can disable the cellular radio such that power is conserved;
a payment module, a payment processing module, and a fulfillment module wherein the user uses the payment module to tender a payment, and wherein the fulfillment module allows the user to access a served call sound if the user has paid for the access;
recovery information corresponding to the at least one stored call sound; and
wherein the selected call sound is one of the at least one served call sound, wherein the selected call sound is not one of the at least one stored call sound, and wherein the call sound retrieval module automatically obtains the selected call sound from the server.

2. A method comprising:
accessing a server from an electronic sound producing device wherein the electronic sound producing device comprises a communications module that interfaces with the communications network and wherein the server serves at least one served call sound;
producing at least one stored call sound wherein one of the at least one served call sound is obtained from the server and stored in the electronic sound producing device;
creating recovery information corresponding to the at least one stored call sound;
presenting a user with at least one call sound option wherein each of the at least one call sound option specifies one of at least one available call sound comprising the at least one stored call;
obtaining a call selection from the user wherein the call selection specifies a selected call sound; and
playing the selected call sound.

3. A system comprising:
a cell phone comprising a keypad, a display, a cellular radio, an internal speaker, and a non-volatile memory storing at least one stored call sound;
a user interface comprising the display and the keypad wherein a presentation is displayed on the display, wherein the presentation offers at least one available call sound comprising the at least one stored call sound, and wherein a user uses the user interface to select a selected call sound;
a call sound retrieval module that obtains at least one served call sound wherein a server serves the at least one served call sound and wherein the call sound retrieval module produces at least one of the at least one stored call sounds wherein the cell phone further comprises the call retrieval module;
an animal and bird simulating module that accesses the at least one stored call sound and plays the at least one stored call sound on at least one speaker wherein the internal speaker is one of the at least one speaker wherein the cell phone further comprises the animal and bird simulating module; and
recovery information corresponding to the at least one stored call sound.

* * * * *